(12) United States Patent
Cong

(10) Patent No.: US 8,527,788 B2
(45) Date of Patent: Sep. 3, 2013

(54) NETWORK WAKE UP SYSTEM WITH PROTECTION FUNCTION

(75) Inventor: Wei-Dong Cong, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 193 days.

(21) Appl. No.: 13/267,856

(22) Filed: Oct. 6, 2011

(65) Prior Publication Data
US 2013/0073876 A1 Mar. 21, 2013

(30) Foreign Application Priority Data

Sep. 15, 2011 (CN) .......................... 2011 1 0273318

(51) Int. Cl.
G06F 1/26 (2006.01)
G06F 1/32 (2006.01)

(52) U.S. Cl.
USPC ........................................................ 713/310

(58) Field of Classification Search
CPC ...... G06F 1/3209; G06F 1/3206; G06F 1/206
USPC .......................................................... 713/310
See application file for complete search history.

(56) References Cited

U.S. PATENT DOCUMENTS

| 7,590,874 | B2* | 9/2009 | Chen | 713/300 |
|---|---|---|---|---|
| 2005/0086460 | A1* | 4/2005 | Huang | 713/2 |
| 2009/0172443 | A1* | 7/2009 | Rothman et al. | 713/323 |
| 2010/0191989 | A1* | 7/2010 | Khatri et al. | 713/310 |

* cited by examiner

Primary Examiner — Glenn A Auve
(74) Attorney, Agent, or Firm — Altis Law Group, Inc.

(57) ABSTRACT

A network wake up system includes a network card, a controller, a south bridge chip, and a baseboard management controller (BMC). The network card receives a network wake up data packet, and outputs a network wake up signal. The BMC determines whether a temperature of the computer is in a predetermined temperature range and determines whether a voltage of the computer is normal, and outputs a state signal to the controller. If the temperature of the computer is in the predetermined temperature range and the voltage of the computer is normal, the controller wakes up the computer at the power-off state. If the temperature of the computer is not in the predetermined temperature range or the voltage of the computer is abnormal, the controller fails to output the network wake up signal to the south bridge chip, so that the computer at the power-off state cannot be woken up.

5 Claims, 1 Drawing Sheet

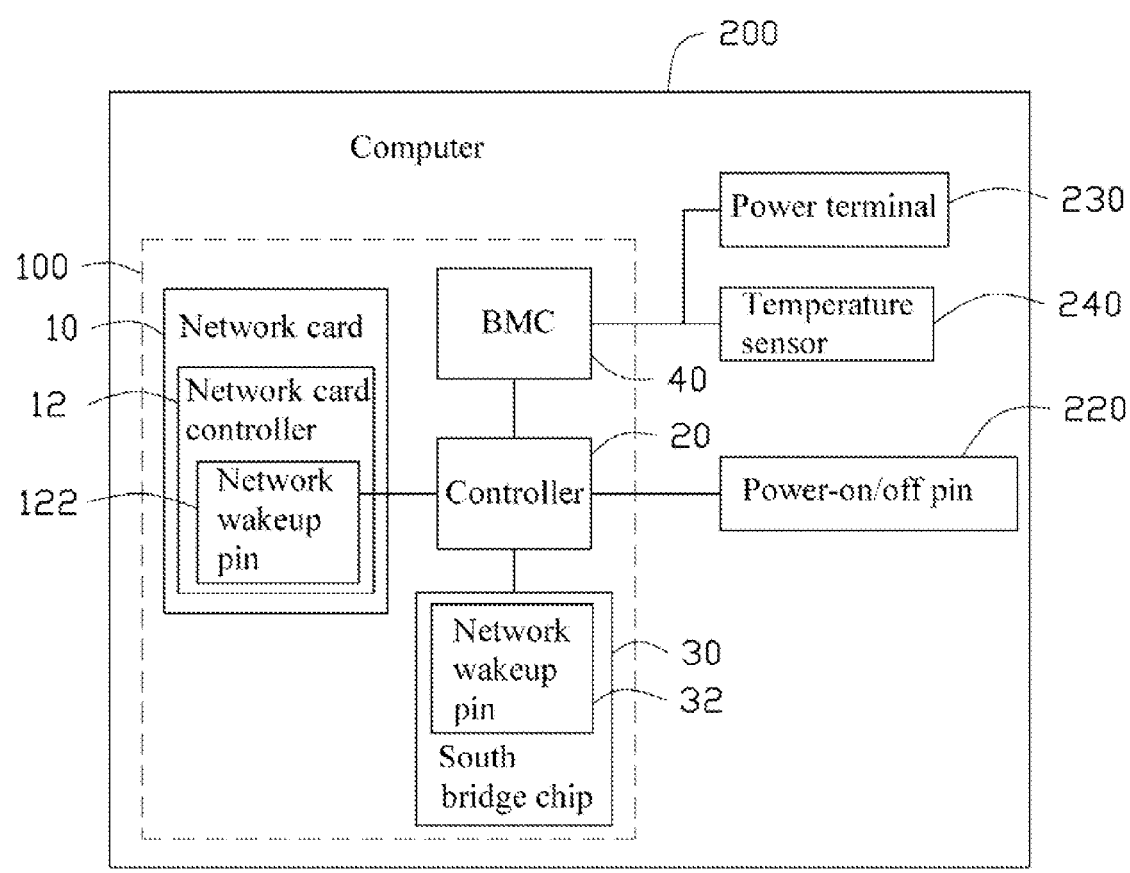

NETWORK WAKE UP SYSTEM WITH PROTECTION FUNCTION

TECHNICAL FIELD

The present disclosure relates to network wake up systems, and particularly, to a network wake up system with protection function.

DESCRIPTION OF RELATED ART

A remote wake up function is a function of starting up a remote computer through a remote operation. That is, the remote computer can be powered on by an instruction over a network on the basis of an operation at a remote location, instead of being waken up locally by an operator. However, if the computer in a power-off protection state is woken up, the computer may be damaged.

BRIEF DESCRIPTION OF THE DRAWING

Many aspects of the present embodiments can be better understood with reference to the following drawing. The components in the drawing are not necessarily drawn to scale, the emphasis instead being placed upon clearly illustrating the principles of the present disclosure. Moreover, in the drawing, all the views are schematic, and like reference numerals designate corresponding parts throughout the several views.

The FIGURE is a schematic block diagram of an embodiment of a network wake up system with protection function.

DETAILED DESCRIPTION

The disclosure, including the accompanying drawing in which like references indicate similar elements, is illustrated by way of example and not by way of limitation. It should be noted that references to "an" or "one" embodiment in this disclosure are not necessarily to the same embodiment, and such references mean at least one.

Referring to the FIGURE, an embodiment of a computer 200 with a network wake up system 100 with protection function to wake up the computer 200 in a power-off state. The network wake up system 100 includes a network card 10, a controller 20, a south bridge chip 30, and a baseboard management controller (BMC) 40. The network card 10 supports a network wake up function. In the embodiment, the controller 20 is a complex programmable logic device (CPLD).

A network card controller 12 is integrated in the network card 10. The network card controller 12 receives a network wake up data packet from a remote terminal (not shown). The network card controller 12 includes a network wake up pin 122. The wake up pin 122 is connected to the controller 20. The network card controller 12 analyzes the received network wake up data packet, and outputs a network wake up signal to the controller 20 through the wake up pin 122 after analyzing the network wake up data packet.

The BMC 40 is connected to a power terminal 230 of the computer 200 to detect a voltage state of the computer 200, and connected to a temperature sensor 240 to detect a temperature state of the computer 200. The BMC 40 is also used to output a state signal to the controller 20 according to the detected power state and temperature state. The state signal denotes a system state of the computer 200. In the embodiment, if the temperature of the computer 200 is not in a predetermined temperature range, or a voltage output by the power terminal 230 of the computer 200 is abnormal, the state signal output by the BMC 40 is high level. The high level denotes that the system state of the computer 200 at the power-off state is abnormal and the state signal is invalid. At that time, the computer 200 at the power-off state cannot be woken up. If the temperature of the computer 200 is in the predetermined temperature range and the voltage output by the power terminal 230 of the computer 200 is normal, the state signal output by the BMC 40 is low level. The low level denotes that the system state of the computer 200 at the power-off state is normal, and the state signal is valid. At that time, the computer 200 at the power-off state can be woken up.

The controller 20 is used to determine whether the state signal output by the BMC 40 is valid. The controller 20 is connected to a network wake up pin 32 of the south bridge chip 30. If the controller 20 determines that the state signal output by the BMC 40 is valid, the controller 20 transmits the wake up signal to the network wake up pin 32 of the south bridge chip 30. The south bridge chip 30 outputs a power-on signal to the controller 20. If the controller 20 determines that the state signal output by the BMC 40 is invalid, the controller 20 does not transmit the wake up signal to the south bridge chip 30.

The controller 20 is connected to a power on/off signal pin 220 of the computer 200 to transmit the power-on signal to the power on/off signal pin 220 of the computer 200 to wake up the computer 200 at the power-off state.

Although numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the embodiments to the full extent indicated by the broad general meaning of the terms in which the appended claims are expressed.

What is claimed is:

1. A network wake up system applied to a computer to wake up the computer at a power-off state, the network wake up system comprising:
   a network card to receive a network wake up data packet, and analyze the network wake up data packet and output a network wake up signal;
   a controller connected to the network card to receive the network wake up signal;
   a south bridge chip connected to the controller; and
   a baseboard management controller (BMC) to determine whether a temperature of the computer is in a predetermined temperature range, or determine whether a voltage of the computer is normal, and output a state signal to the controller;
   wherein if the temperature of the computer is in the predetermined temperature range and the voltage of the computer is normal, the state signal is valid, if the temperature of the computer is not in the predetermined temperature range or the voltage of the computer is abnormal, the state signal is invalid, when the controller receives the valid state signal, the controller outputs the network wake up signal to the south bridge chip to drive the south bridge chip to output a power-on signal to the controller, the controller wakes up the computer at the power-off state after receiving the power-on signal, when the controller receives the invalid state signal, the controller fails to output the network wake up signal to the south bridge chip so that the computer at the power-off state cannot be woken up.

2. The network wake up system of claim 1, wherein the BMC is connected to a power terminal of the computer to detect the voltage output from the power terminal, the BMC is connected to a temperature sensor of the computer to detect the temperature of the computer.

3. The network wake up system of claim 1, wherein the valid system state signal is a low level signal, the invalid system state signal is a high level signal.

4. The network wake up system of claim 1, wherein the controller is a complex programmable logic device.

5. The network wake up system of claim 1, wherein the controller is connected to a power-on/off pin of the computer to output the power-on signal to the power-on/off pin to wake up the computer at the power-off state.

* * * * *